United States Patent
Ushijima (10) Patent No.: US 8,171,324 B2
(45) Date of Patent: May 1, 2012

(54) INFORMATION PROCESSING DEVICE, DATA WRITING METHOD, AND PROGRAM FOR THE SAME

(75) Inventor: Takuma Ushijima, Isehara (JP)

(73) Assignee: Hitachi, Ltd., Tokyo (JP)

( * ) Notice: Subject to any disclaimer, the term of this patent is extended or adjusted under 35 U.S.C. 154(b) by 944 days.

(21) Appl. No.: 12/164,249

(22) Filed: Jun. 30, 2008

(65) Prior Publication Data

US 2009/0271648 A1 Oct. 29, 2009

(30) Foreign Application Priority Data

Apr. 24, 2008 (JP) .................................. 2008-114299

(51) Int. Cl.
*G06F 1/32* (2006.01)
*G06F 12/16* (2006.01)

(52) U.S. Cl. .......................... 713/324; 713/320; 711/161

(58) Field of Classification Search .......... 713/300–324; 711/161, 162
See application file for complete search history.

(56) References Cited

U.S. PATENT DOCUMENTS

| | | | |
|---|---|---|---|
| 7,769,947 B2 * | 8/2010 | Ranganathan et al. | 711/114 |
| 2004/0268069 A1 * | 12/2004 | Satoyama et al. | 711/162 |
| 2005/0120025 A1 * | 6/2005 | Rodriguez et al. | 707/10 |
| 2007/0162692 A1 | 7/2007 | Nishimoto et al. | |
| 2009/0235104 A1 * | 9/2009 | Fung | 713/324 |

FOREIGN PATENT DOCUMENTS

| | | |
|---|---|---|
| JP | 2007-511820 | 5/2007 |
| JP | 2007-156597 | 6/2007 |
| WO | 2005/043323 A2 | 5/2005 |

* cited by examiner

*Primary Examiner* — Dennis M Butler
(74) *Attorney, Agent, or Firm* — Brundidge & Stanger, P.C.

(57) ABSTRACT

An information processing apparatus comprises: a creation unit creating a preset number of pieces of second data by duplicating first data, and holding the second data in a predetermined area or sending the second data to another information processing apparatus; a first writing unit for writing the first data in a first storage device; an activation unit activating power to a second storage device at a predetermined time, the second storage device being in a stopped state; a second writing unit for writing the second data in the second storage device activated by the activation unit by retrieving the second data from the predetermined area or another information processing apparatus after the second storage device is activated by the activation unit; a stop unit stopping power to the second storage device in which the second data is written by the second writing unit.

15 Claims, 8 Drawing Sheets

| | Node 1 | | | | Node 2 | | | | Node 3 | | | | Node 4 | | | |
|---|---|---|---|---|---|---|---|---|---|---|---|---|---|---|---|---|
| | RG1 | RG2 | RG3 | RG4 | RG1 | RG2 | RG3 | RG4 | RG1 | RG2 | RG3 | RG4 | RG1 | RG2 | RG3 | RG4 |
| File 1 | · | 1 | · | · | · | · | 2 | · | · | · | · | · | · | · | 2 | · |
| File 2 | · | · | · | · | · | · | 2 | · | · | · | · | 2 | · | 1 | · | · |
| File 3 | · | 1 | · | · | · | · | · | · | 1 | · | · | 3 | · | · | 3 | · |
| File 4 | · | · | · | · | · | · | 3 | · | · | · | · | · | · | · | 3 | · |

| NODE | RAID GROUP | CURRENT AVAILABLE SPACE | ANTICIPATED AVAILABLE SPACE |
|---|---|---|---|
| NODE 1 | RAID GROUP 1 | 40,869,130 | 40,465,325 |
| | RAID GROUP 2 | 40,529,138 | 40,358,668 |
| NODE 2 | RAID GROUP 1 | 46,955,569 | 46,625,449 |
| | RAID GROUP 2 | 46,264,597 | 46,065,228 |
| NODE 3 | RAID GROUP 1 | 43,391,221 | 43,112,358 |
| | RAID GROUP 2 | 45,264,978 | 45,116,975 |
| NODE 4 | RAID GROUP 1 | 44,717,772 | 44,446,778 |
| | RAID GROUP 2 | 44,181,648 | 44,006,779 |

| NODE | RAID GROUP | CURRENT AVAILABLE SPACE | ANTICIPATED AVAILABLE SPACE |
|---|---|---|---|
| NODE 1 | RAID GROUP 3 | 47,168,349 | 47,005,795 |
| | RAID GROUP 4 | 40,765,444 | 40,446,658 |
| NODE 2 | RAID GROUP 3 | 46,116,761 | 46,065,798 |
| | RAID GROUP 4 | 47,112,346 | 47,055,779 |
| NODE 3 | RAID GROUP 3 | 43,222,334 | 43,117,446 |
| | RAID GROUP 4 | 42,444,222 | 42,115,152 |
| NODE 4 | RAID GROUP 3 | 47,482,997 | 47,228,779 |
| | RAID GROUP 4 | 46,777,772 | 46,556,779 |

INFORMATION PROCESSING DEVICE, DATA WRITING METHOD, AND PROGRAM FOR THE SAME

CROSS-REFERENCES TO RELATED APPLICATIONS

This application relates to and claims priority from Japanese Patent Application No. 2008-114299, filed on Apr. 24, 2008, the entire disclosure of which is incorporated herein by reference.

BACKGROUND

The invention relates generally to an information processing device, data writing method, and program for the same, and is suitable for application in, for example, storage system provided with a plurality of archive nodes.

Usually, a distributed archive technique involving, when archive data (master archive data) sent from an archive server and a write request are received, copying the number of pieces of archive data based on a predetermined policy and holding those pieces of archive data on a plurality of archive nodes so as to maintain the reliability of master data of archive data, has been widely used (e.g., see JP2007-511820 T).

Meanwhile, a power-saving technique of stopping the power of an HDD (Hard Disk Drive) constituting a volume which has not been accessed from a server for a certain period of time, thereby reducing power consumption of storage device, has also been widely used (e.g., see JP2007-156597 A).

SUMMARY

However, with the combination of the conventional distributed archive technique and power-saving technique, the following problem exists when stopping the power of an HDD, which constitute a volume of archive data kept by means of the distributed archive technique and has not been accessed for a certain period of time, by means of the power-saving technique.

More specifically, the copy of archive data created by means of the distributed archive technique is used only when the master data for the archive data is lost, so the copy is hardly ever referred to. However, in the distributed archive technique, there is a case when master archive data and the copy of archive data are written in a single volume regardless of HDDs constituting a volume, and the power of the HDDs cannot be turned-off because all HDDs are frequently accessed, so there is a problem in that the power consumption of storage device cannot be reduced.

The present invention has been devised in consideration of the above-described points, and it is an object of the present invention to provide an information processing device, data writing method, and program that are capable of dramatically improving operational efficiency.

In order to solve the aforementioned problem, according to an aspect of the invention, an information processing apparatus comprises: a creation unit creating a preset number of pieces of second data by duplicating first data sent from a host computer, and holding the second data in a predetermined area or sending the second data to another information processing apparatus; a first writing unit for writing the first data in a first storage device in which the first data is to be written; an activation unit activating power to a second storage device in which the second data is to be written at a predetermined time, the second storage device being in a stopped state; a second writing unit for writing the second data in the second storage device activated by the activation unit by retrieving from the predetermined area or another information processing apparatus the second data that is to be written in the second storage device after the second storage device is activated by the activation unit; and a stop unit stopping power to the second storage device in which the second data is written by the second writing unit.

According to another aspect of the invention, a data writing method in an information processing apparatus comprises: a first step where a creation unit creates a preset number of pieces of second data by duplicating first data sent from a host computer, and the creation unit holds the second data in a predetermined area or sends the second data to another information processing apparatus; a second step where a writing unit writes the first data in a first storage device in which the first data is to be written; a third step where an activation unit activates power to a second storage device in which the second data is to be written at a predetermined time, the second storage device being in a stopped state; a fourth step where the writing unit writes the second data in the second storage device activated in the third step by retrieving from the predetermined area or another information processing apparatus the second data that is to be written in the second storage device after the second storage device is activated in the third step; and a fifth step where a stop unit stops power to the second storage device in which the second data is written in the fourth step.

According to yet another aspect of the invention, a program for an information processing apparatus executes: a first step of creating a preset number of pieces of second data by duplicating first data sent from a host computer, and holding the second data in a predetermined area or sending the second data to another information processing apparatus; a second step of writing the first data in a first storage device in which the first data is to be written; a third step of activating power to a second storage device in which the second data is to be written at a predetermined time, the second storage device being in a stopped state; a fourth step of writing the second data in the second storage device activated in the third step by retrieving from the predetermined area or another information processing apparatus the second data that is to be written in the second storage device after activating the second storage device in the third step; and a fifth step of stopping power to the second storage device in which the second data is written in the fourth step.

Accordingly, the copy data of the first data and second data is written to two storage devices: the first storage device, which is a location where the first data is to be written; and the second storage device, which is an area where the second data is to be written, and is in a stopped state, so the running time of the second storage device can be minimized and the power consumption can be effectively reduced.

According to the present invention, an information processing device, data writing method, and program that are capable of dramatically improving operational efficiency can be realized.

Other aspects and advantages of the invention will be apparent from the following description and the appended claims.

DETAILED DESCRIPTION OF PREFERRED EMBODIMENTS

An embodiment of the present invention will be described below with reference to the attached drawings. It should be understood that the present invention is not limited to this embodiment.

Figure 1:
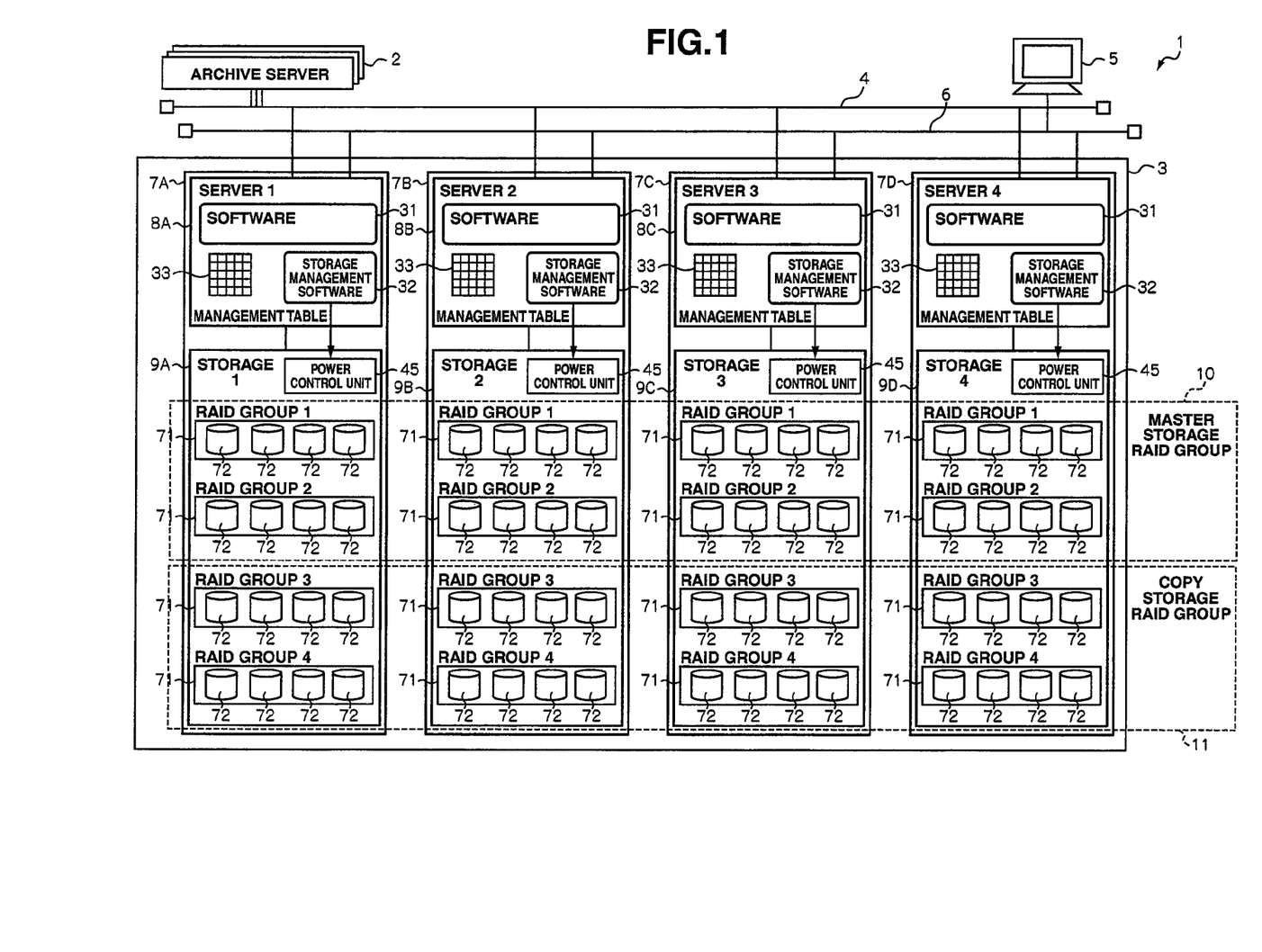
FIG. 1 is a block diagram showing the configuration of storage system according to the embodiment.

FIG. 1 shows the configuration of storage system 1 in the present embodiment. The storage system 1 is configured with an archive server 2 (a host computer) and archive storage 3 connected via a predetermined network 4, such as a LAN (Local Area Network). Also, the storage system 1 is configured with the archive storage 3 and a management server 5 connected via a predetermined network 6, such as a LAN.

The archive server 2 is a computer device equipped with an information processing resource (not shown), such as a CPU (Central Processing Unit) or memory, and is configured with, for example, a personal computer, a workstation, a main frame, or the like. Also, the archive server 2 is provided with information input devices (not shown), such as a keyboard, a switch, a pointing device, and a microphone, etc., and information output devices (not shown), such as a monitor display, and speaker, etc.

The archive server 2 sends a write request and file to the archive storage 3, writes the aforementioned file in the archive storage 3, and reads out the file written in the archive storage 3 by sending a readout request.

The archive storage 3 is provided with a plurality of archive nodes 7 (7A-7D) (corresponding to nodes 1-4) that are information processing devices. Respective archive nodes 7 are configured to interconnect with one another via the network 6. The archive nodes 7 are configured with servers 8 (8A-8D) (corresponding to servers 1-4) and storage 9 (9A-9D) (corresponding to storage 1-4) connected via a predetermined network, such as a SAN (Storage Area Network).

The servers 8 are provided with: software (program) 31 performing archive processing; storage management software 32 performing storage management processing; and a management table 33 used in the archive processing and the storage management processing.

The storage 9 is provided with a plurality of HDDs 44 and a power control unit 45. The storage 9 operates the plurality of HDDs 44 using a RAID (Redundant Arrays of Independent Disks) system. The storage 9 sets one or more logical volumes 72 (hereinafter referred to as the "volume") in RAID groups 71 (RAID groups 1-4) that are physical storage areas provided by one or more HDDs 44. The storage 9 then writes the sent files into this volume 72 on a predetermined-sized block (hereinafter referred to as "logical block")—basis.

The storage 9 respectively assigns unique identifiers (hereinafter referred to as "LUs (Logical Unit numbers)") to the volumes 72. The storage 9 uses the combination of this LU and unique numbers (LBA: Logical Block Addresses) respectively assigned to the logical blocks as an address, and performs file input and output by specifying the aforementioned address.

Also, the storage 9 consists of RAID groups 71 combined into two groups, namely, a master storage RAID group 10 (consisting of RAID group 1 and RAID group 2) in which the sent files (master files) are written, and a copy storage RAID group 11 (consisting of RAID group 3 and RAID group 4) in which the copies of the aforementioned files (copy files) are written. The storage 9 keeps the HDD 44 constituting the master storage RAID group 10 (consisting of the RAID group 71) constantly in an active state and the HDD 44 constituting the copy storage RAID group 11 (consisting of the RAID group 71) usually in a stopped state (or power-saving state (standby mode)).

The management server 5 is a computer device equipped with an information processing resource (not shown), such as a CPU (Central Processing Unit) or memory, and is configured with, for example, a lap-top type personal computer, or the like. Also, the management server 5 is provided with information input devices (not shown), such as a keyboard, a switch, a pointing device, and a microphone, etc., and information output devices (not shown), such as a monitor display, and a speaker, etc.

The management server 5 retrieves an HDD management table 62 (will be described later below) from the archive storage 3, and manages the archive storage 3, namely, the creation of a new RAID group 71 or new volume 72, etc.

Next, the outline of distributed archive processing in the storage system 1 in the present embodiment will be described. Each of the servers 8 communicates with the other by using software 31, and they send and receive files via the network 6. Also, when any change happens in the management table 33, each server 8 sends the changes to another server 8, so the management table 33 is constantly kept up-to-date.

Furthermore, each server 8 manages the available spaces in the RAID groups 71 in each storage 9 in the management table 33, and constantly checks available spaces in the archive nodes 7 (more specifically, the RAID group 71 in the storage 9). Also, each server 8 recognizes whether the RAID group 71 in the storage 9 belongs to the master storage RAID group 10 or the copy storage RAID group 11 based on the management table 33.

The archive server 2 recognizes the archive storage 3 as one large storage pool. Therefore, when writing a file to the archive storage 3, the archive server 2 sends a write request and file without identifying in which archive nodes 7 a file is to be written.

When receiving a write request and file (master file) sent from the archive server 2, the server 8 (a receiving server 8) refer to the management table 33 by using the software 31, and write files in the volume 72 in the storage 9 in descending order of available space size, and in accordance with redundancy.

More specifically, the receiving server 8 specifies the number of copy files to be created depending on redundancy, check available space in the storage 9 by referring to the management table 33, and determine in which archive node 7 master files and copy files is to be stored. For example, if the redundancy is "3," the receiving server 8 decides to send master files to, for example, the archive node 7A whose available space is the largest in the master storage RAID group 10; and to send copy files to the archive node 7C and the archive node 7D whose available spaces are respectively the first and second largest in the copy storage RAID group 11.

Subsequently, the receiving server 8 sends the master files to the archive node 7A. The archive node 7A then writes the master files in a relevant volume 72 in the master storage RAID group 10 in the storage 9A.

Meanwhile, the server 8C in the archive nodes 7C sends to the storage 9 a power-on instruction for turning the power of the HDD 44 on at a predetermined time by using storage management software 32. Incidentally, the power-on instruction is a instruction for turning on the power of the HDD 44 constituting the copy storage RAID group 11 in the storage 9C in which copy files is to be written. When receiving the power-on instruction, the storage 9C activates the HDD 44 by turning on the power of the relevant HDD 44 constituting the copy storage RAID group 11 by means of the power control unit 45. The server 8C then sends a copy file sending request to the receiving server 8.

When receiving the copy file sending request sent from a server 8C, the receiving server 8 creates a copy file for the relevant master file, and sends the created copy file to the server 8C. The server 8C then writes the copy file in a relevant volume 72 in the copy storage RAID group 11 in the storage 9C.

Subsequently, the server 8C sends to the storage 9C a power-off instruction for turning the HDD 44 off by using the storage management software 32. Incidentally, the power-off instruction is a instruction for turning off the power of the HDD 44 constituting the RAID group 71 in the copy storage RAID group 11 in the storage 9C in which copy files were written. When receiving the power-off instruction, the storage 9C stops the HDD 44 by turning off the power of a relevant HDD 44 constituting the copy storage RAID group 11 by means of the power control unit 45.

The receiving server 8, the server 8D in the archive nodes 7D, and the storage 9D conduct the same processing as that conducted by the above-described receiving server 8, the server 8C in the archive nodes 7C, and the storage 9C; activate a relevant HDD 44 constituting the copy storage RAID group 11 by means of the power control unit 45; write copy files in a relevant volume 72 in the RAID group 71 in the copy storage RAID group 11 in the storage 9D; and stop an HDD 44 constituting the relevant RAID group 71 by means of the power control unit 45.

Figure 2:
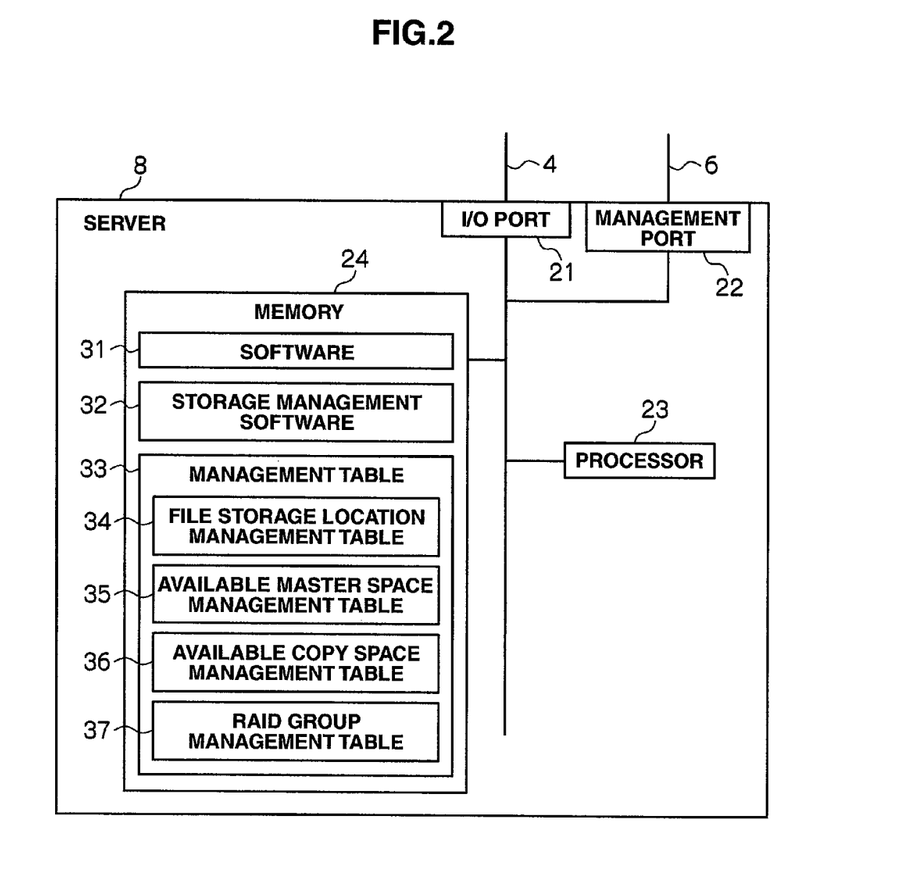
FIG. 2 is a block diagram showing the configuration of a server.

FIG. 2 shows the configuration of the servers 8 (8A-8D). The servers 8 include an I/O (Input/Output) port 21 for connecting to the network 4; a management port 22 for connecting to the network 6; processor 23 for controlling all the servers 8; and memory 24 for storing a predetermined program and table, and are configured by interconnecting them via a circuit, such as an internal bus, etc.

The software 31 for executing archive processing, the storage management software 32 for executing storage management processing, and the management table 33 used in the archive processing and storage management processing are stored in the memory 24. The management table 33 consists of a file storage location management table 34, an available master space management table 35, an available copy space management table 36, and a RAID group management table 37.

When receiving a file from the archive server 2, the processor 23, by executing the software 31, checks available spaces in each storage 9 with reference to the management table 33, creates copy files depending on redundancy, and performs the archive processing for writing master files and copy files in a volume 72 in the storage 9 based on available spaces in the master storage RAID group 10 and the copy storage RAID group 11.

At a predetermined time, the processor 23, by executing the storage management software 32, performs the storage management processing for activating or stopping the HDD 44 constituting the copy storage RAID group 11 in the storage 9 in which copy files is to be written.

The file storage location management table 34 manages the RAID groups 71 in which files sent from the archive server 2 are stored. The available master space management table 35 manages available spaces on the master storage RAID group 10 basis. The available copy space management table 36 manages available spaces on the copy storage RAID group 11 basis. The RAID group management table 37 manages whether the RAID group 71 belongs to the master storage RAID group 10 or the copy storage RAID group 11.

Incidentally, the details of processing performed by the processor 23 by executing the software 31 and the storage management software 32, and the detailed configurations of the file storage location management table 34, the available master space management table 35, and the available copy space management table 36 will be described later below.

Figure 3:
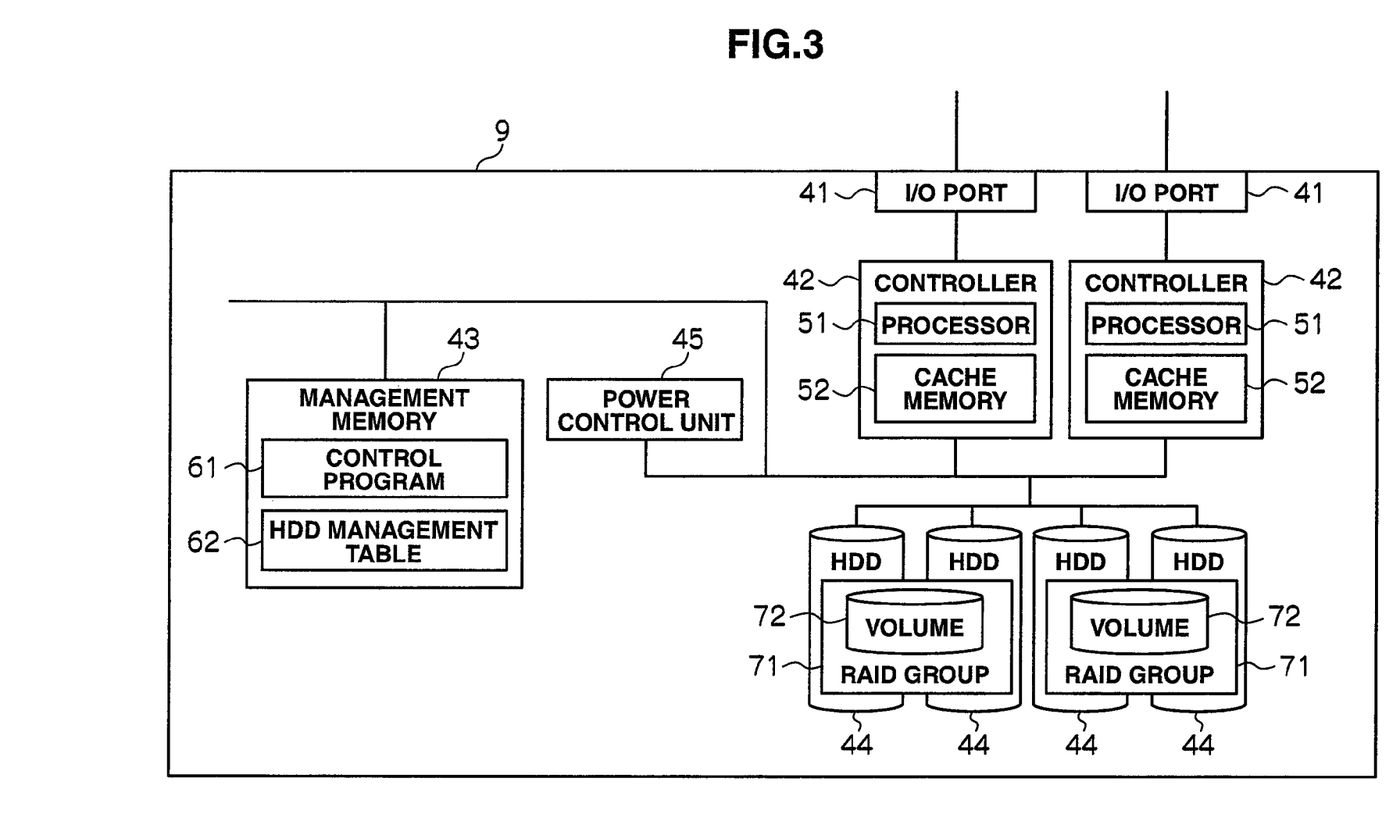
FIG. 3 is a block diagram showing a configuration for storage.

FIG. 3 shows the configuration of the storage 9 (9A-9D). The storage 9 includes: an I/O port 41 for connecting to the server 8 via a predetermined network; a controller 42 for controlling the entire storage 9; management memory 43 for storing a predetermined program and table; the HDD 44 for storing a file; and the power control unit 45 for performing power control processing for the HDD 44, and is configured by interconnecting them via a circuit, such as an internal bus.

The controller 42 is internally provided with: a processor 51 standing between the I/O port 41 and the HDD 44 and performing the control within the storage 9; and cache memory 52 for temporarily storing files sent and received between the servers 8.

A control program 61 for controlling the storages 9 and the HDD management table 62 are stored in the management memory 43. The controller 42 performs control processing for sending and receiving data between the I/O port 41 and the HDD 44 by executing the control program 61. The HDD management table 62 manages each of the HDDs 44, the RAID groups 71, and volumes 72, and manages them in association with one another.

Accordingly, in the HDD management table 62, it is possible to manage the HDDs 44 constituting the RAID groups 71 and volumes 72 in the RAID groups 71; and also possible to recognize whether a RAID group 71 belongs to the master storage RAID group 10 or the copy storage RAID group 11.

One or more HDDs 44 constitute the RAID groups 71 (constituting the master storage RAID group 10 and the copy storage RAID group 11). When more than one the HDD 44 constitutes the RAID group 71, the HDD 44 can form a RAID configuration, such as a RAID 1, a RAID 5, or the like. Also, the RAID groups 71 are logically divided into one or more volumes 72.

The power control unit 45 activates or stops a relevant HDD 44 in accordance with a power-on instruction or power-off instruction sent from the server 8.

Figure 4:
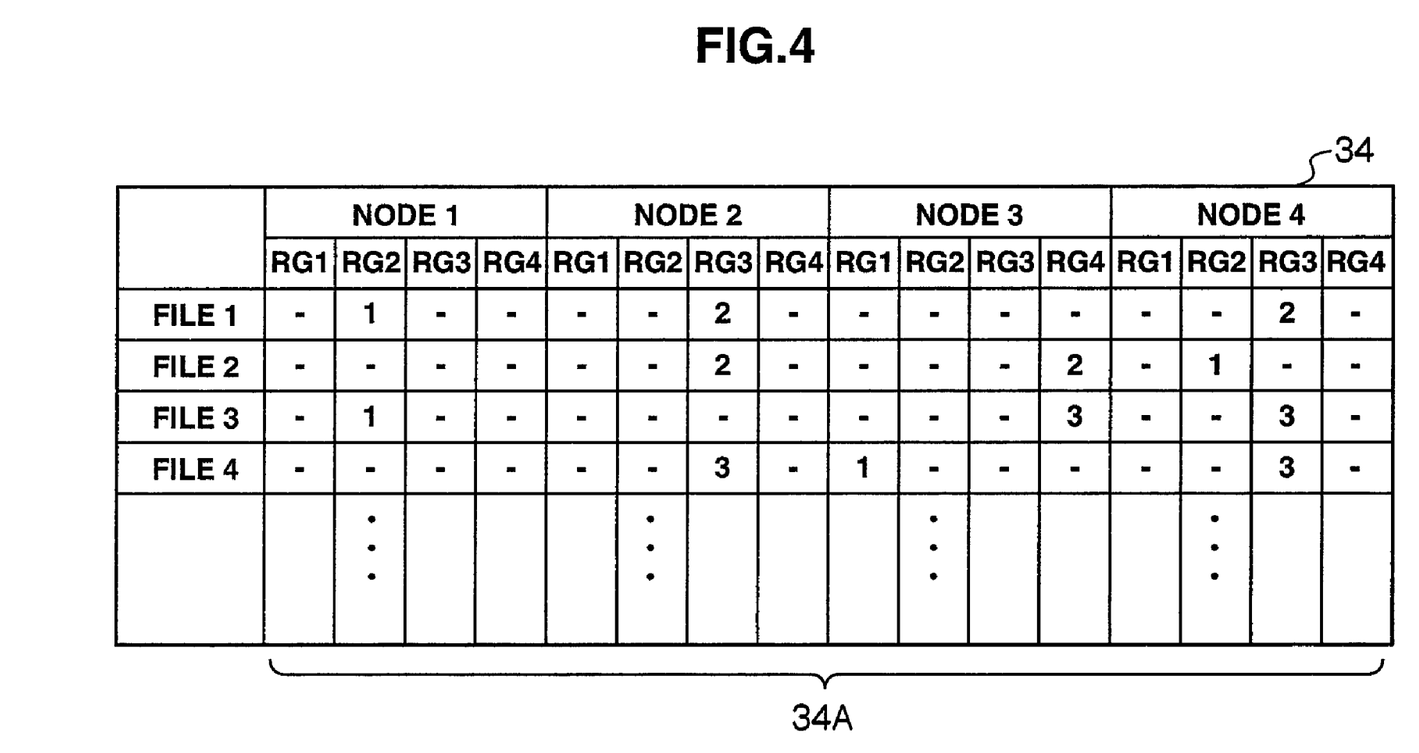
FIG. 4 is a conceptual diagram explaining the configuration of a file storage location management table.

FIG. 4 shows the configuration of the file storage location management table 34. The file storage location management table 34 consists of "NODE" columns 34A. The "NODE" columns 34A are created for each archive node 7. In the "NODE" columns 34A, node names uniquely identifying the archive nodes 7 are stored. Also in the "NODE" columns 34A, "RAID GROUP" columns (RG) are created for each RAID group 71 in the storage 9 in the archive node 7. In the "RAID GROUP" columns, RAID group names uniquely identifying the RAID group 71 are stored.

When a file is sent from the archive server 2, "FILE" columns are added in the file storage location management table 34. In the "FILE" columns, file names uniquely identifying a file are stored.

When a master file is written in a volume 72 (an HDD 44) in the master storage RAID group 10 in the storage 9 which corresponds to the server 8 in which the master file is to be written, "1" is written in a relevant "RAID GROUP" column in the "NODE" columns 34A in the file storage location management table 34.

Also, when a volume 72 in the copy storage RAID group 11 in the storage 9 which corresponds to the server 8 in which a copy file is to be written is determined, "2" is written in a relevant "RAID GROUP" column in the "NODE" columns 34A in the file storage location management table 34. More specifically, "2" is written in a relevant "RAID GROUP" column in the file storage location management table 34 when a copy file is not written in a volume 72 (an HDD 44) in the copy storage RAID group 11 in the storage 9 which corresponds to the relevant server 8, and copy file write processing has not been conducted.

Furthermore, when a copy file is written in a volume 72 (an HDD 44) in the copy storage RAID group 11 in the storage 9 which corresponds to the server 8 in which a copy file is to be written, "3" is written in a relevant "RAID GROUP" column in he "NODE" columns 34A in the file storage location management table 34.

Accordingly, master files and RAID groups 71 in which copy files to be written and written copy files should be stored can be managed in the file storage location management table 34.

Figure 5:
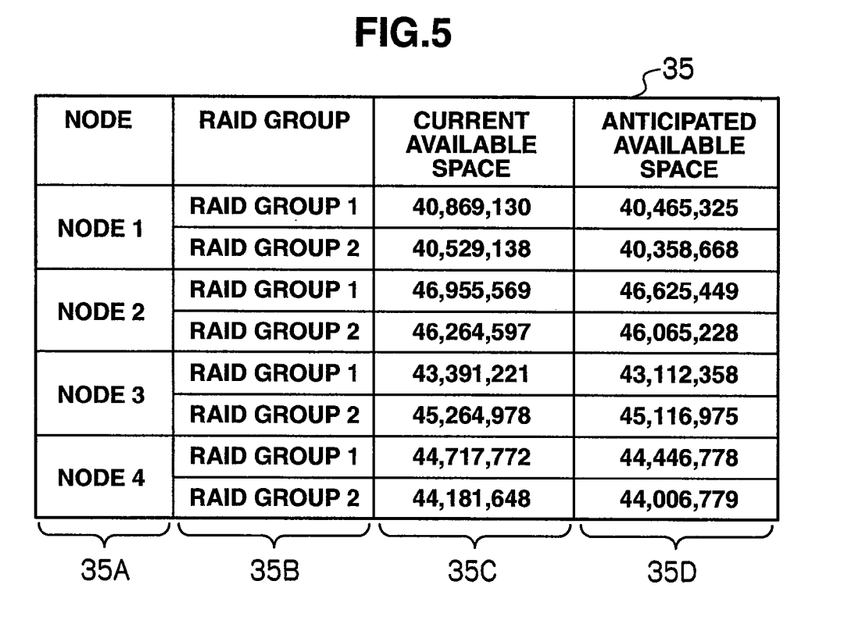
FIG. 5 is a conceptual diagram explaining the configuration of an available master space management table.

FIG. 5 shows the configuration of the available master space management table 35. The available master space management table 35 consists of: "NODE" columns 35A; "RAID GROUP" columns 35B; "CURRENT AVAILABLE SPACE" columns 35C; and "ANTICIPATED AVAILABLE SPACE" columns 35D.

Node names uniquely identifying the archive nodes 7 are stored in the "NODE" columns 35A. RAID group names uniquely identifying the RAID group 71 (in the master storage RAID group 10) in the archive nodes 7 are stored in the "RAID GROUP" columns 35B. The current available spaces in the RAID groups 71 in the archive nodes 7 are stored in the "CURRENT AVAILABLE SPACE" columns 35C. The anticipated available spaces at the time of writing a file in the RAID groups 71 in the archive nodes 7 are stored in the "ANTICIPATED AVAILABLE SPACE" columns 35D.

Figure 6:
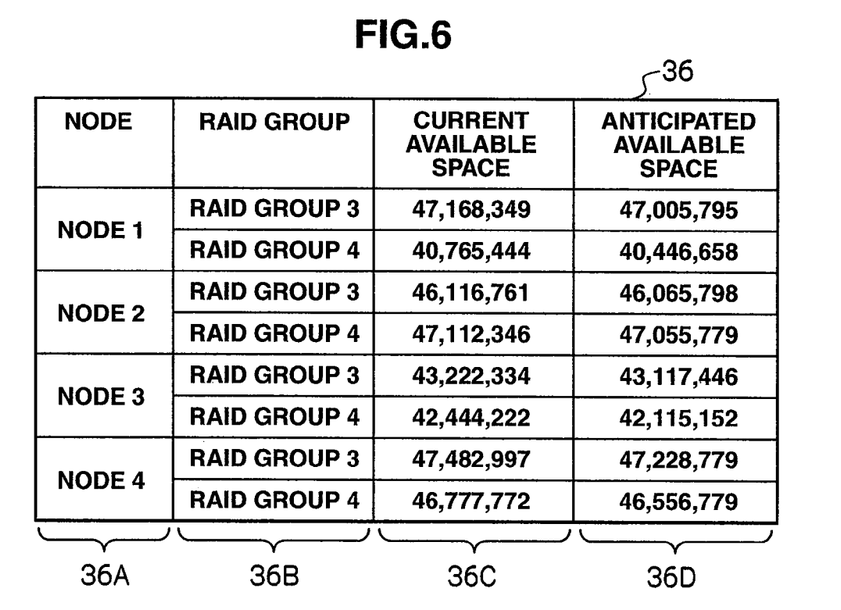
FIG. 6 is a conceptual diagram provided for explaining the configuration of an available copy space management table.

FIG. 6 shows the configuration of the available copy space management table 36. The available copy space management table 36 consists of: "NODE" columns 36A; "RAID GROUP" columns 36B; "CURRENT AVAILABLE SPACE" columns 36C; and "ANTICIPATED AVAILABLE SPACE" columns 36D.

Node names uniquely identifying the archive nodes 7 are stored in the "NODE" columns 36A. RAID group names uniquely identifying the RAID group 71 (in the copy storage RAID group 11) in the archive nodes 7 are stored in the "RAID GROUP" columns 36B. The current available spaces in the RAID groups 71 in the archive nodes 7 are stored in the "CURRENT AVAILABLE SPACE" columns 36C. The anticipated available spaces at the time of writing a file in the RAID groups 71 in the archive nodes 7 are stored in the "ANTICIPATED AVAILABLE SPACE" columns 36D.

Figure 7:
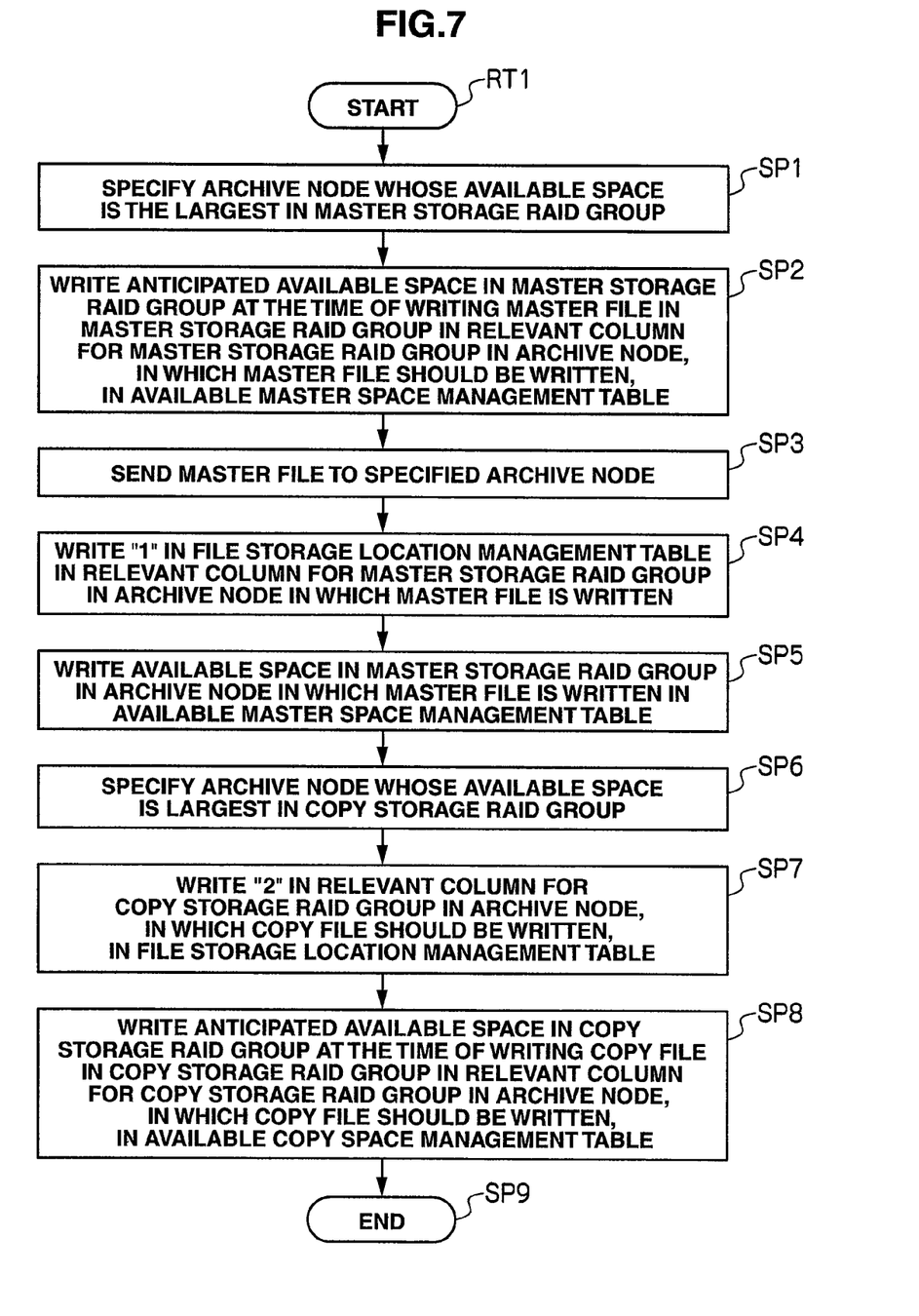
FIG. 7 is a flowchart illustrating master file write processing steps.

FIG. 7 is an example of a flowchart illustrating detailed processing steps performed by the processor 23 in relation to master file writing processing in the receiving server 8 in the storage system 1.

When, for example, receiving a write request and master file sent from the archive server 2, the processor 23 in the receiving server 8 specifies the number of copy files to be created depending on redundancy; and specifies the archive node 7 whose available space is the largest in the master storage RAID group 10 with reference to the "ANTICIPATED AVAILABLE SPACE" columns 35D in the available master space management table 35, in accordance with the master file writing processing steps (RT1) shown in FIG. 7, by executing the software 31 (SP1).

Subsequently, the processor 23 in the receiving server 8 writes an anticipated available space at the time of writing a master file in the master storage RAID group 10 in the "ANTICIPATED AVAILABLE SPACE" column 35D, which corresponds to the master storage RAID group 10 in the archive nodes 7 in which the master file is to be written, in the available master space management table 35 (SP2).

The processor 23 in the receiving server 8 then designates the master storage RAID group 10 in which the master file is to be written, and sends the master file to the specified archive node 7 (SP3). Incidentally, in the case illustrated in FIG. 9, the server 8 in the receiving server 8 and the designated archive node 7 are the same servers 8, so no master file will be sent. Furthermore, the server 8 in the archive node 7 to which the master file was sent writes the master file in a relevant volume 72 in the master storage RAID group 10 in the storage 9A (see FIG. 9(1)).

The processor 23 in the receiving server 8 then adds a "FILE" column for the aforementioned master file in the file storage location management table 34, and writes "1" in the "RAID GROUP" column, which corresponds to the aforementioned "FILE" column, in the master storage RAID group 10 in the archive nodes 7 in which the master file is written (SP4).

The processor 23 in the receiving server 8 then writes the available spaces in the master storage RAID group 10 in the archive nodes 7 in which the master file was written in a relevant "CURRENT AVAILABLE SPACE" column 35C, which corresponds to the master storage RAID group 10 in the relevant archive node 7, in the available master space management table 35 (SP5).

The processor 23 in the receiving server 8 then specifies the number of the archive nodes 7 whose available space is relatively large in the copy storage RAID group 11 equivalent to the number calculated by subtracting 1 from redundancy, with reference to the "ANTICIPATED AVAILABLE SPACE" column 36D in the available copy space management table 36 (SP6).

Figure 9:
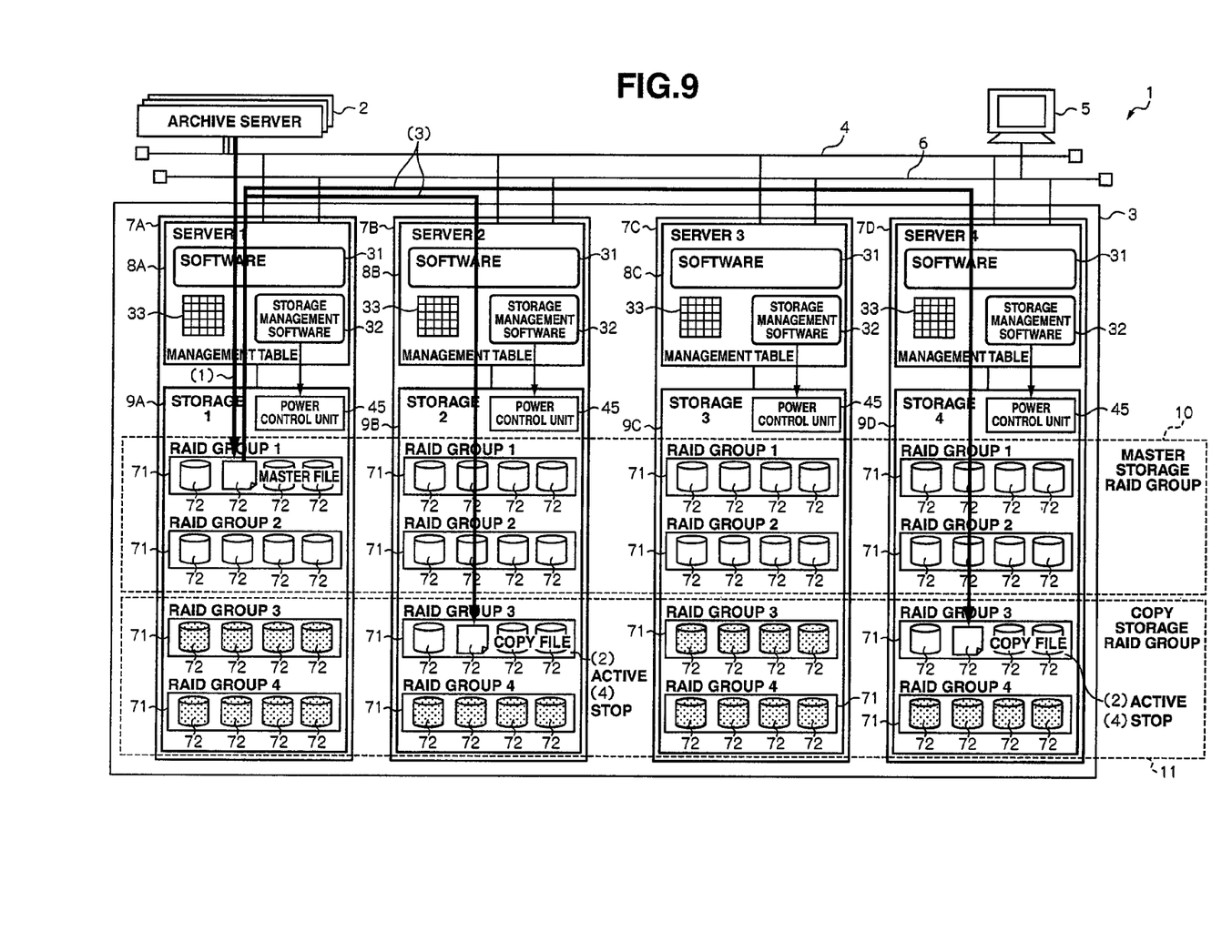
FIG. 9 is a conceptual diagram explaining master file write processing and copy file write processing.

Incidentally, in a case illustrated in FIG. 9, the processor 23 in the receiving server 8 specifies that the redundancy is "3," and the archive nodes 7B and the archive nodes 7C are the archive nodes 7 whose available space is large.

The processor 23 in the receiving server 8 then writes "2" in the "RAID GROUP" column, which corresponds to the "FILE" column for the added master file, for the copy storage RAID group 11 in the archive node 7 in which a copy file is to be written in the file storage location management table 34 (SP7).

The processor 23 in the receiving server 8 then writes the anticipated available space at the time of writing a copy file in the copy storage RAID group 11 in the "ANTICIPATED AVAILABLE SPACE" column, which corresponds to the copy storage RAID group 11 in the archive node 7 in which the copy file is to be written, in the available copy space management table 36 (SP8).

Eventually, the processor 23 in the receiving server 8 terminates the master file writing processing steps RT1 illustrated in FIG. 7 (SP9).

Figure 8:
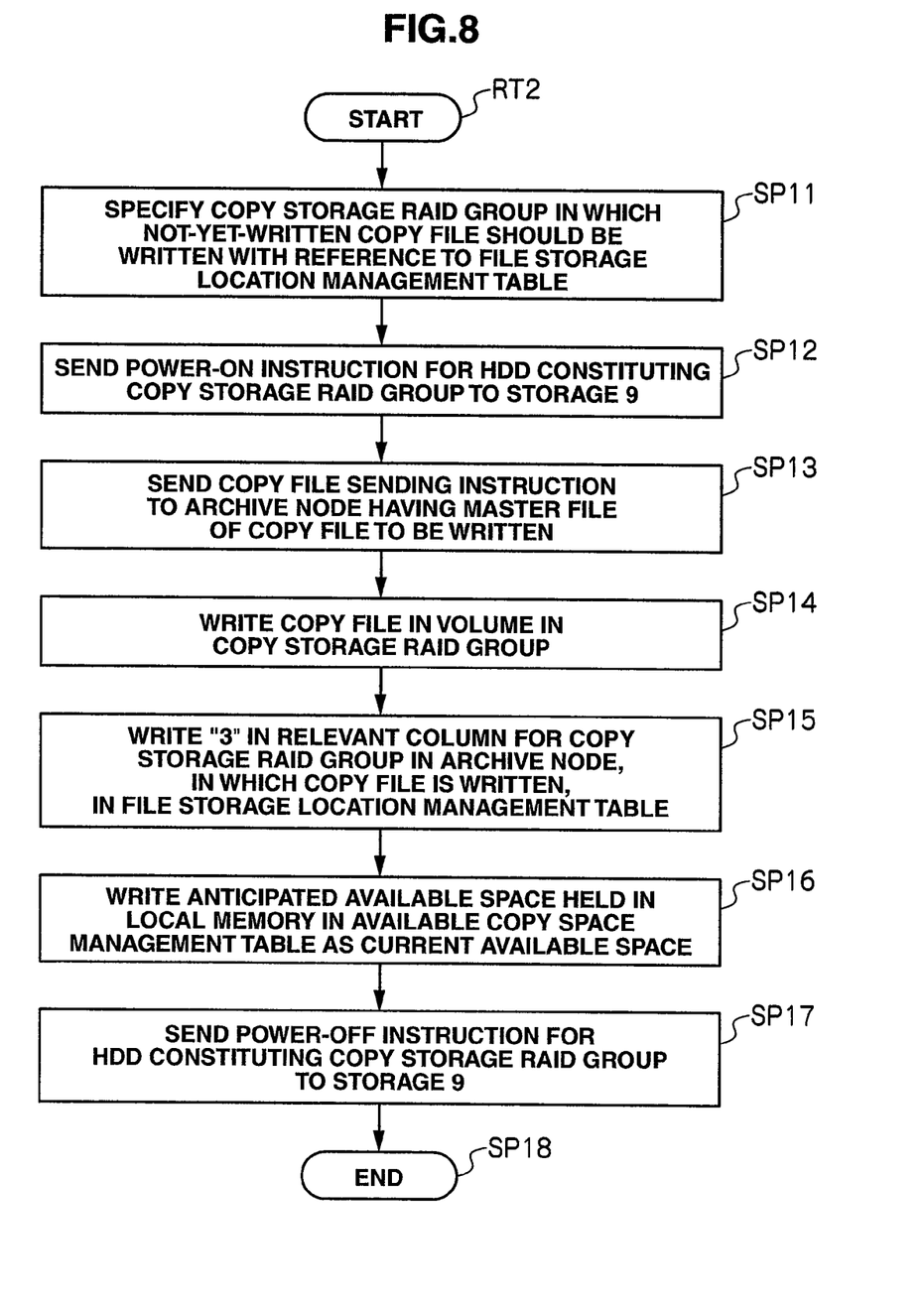
FIG. 8 is a flowchart illustrating copy file write processing steps.

FIG. 8 is an example of a flowchart illustrating detailed processing steps in the processor 23 in relation to copy file writing processing in each server 8 in the storage system 1.

In existing distributed archive technique, copy files are written in another archive node 7 at the same time master files are written. However, as explained above, according to this technique, the HDD 44 is frequently activated and stopped, so power consumption cannot effectively be reduced. Therefore, in the present invention, copy files are written all at once so as to effectively reduce the power consumption.

More specifically, in the storage system 1 in the present invention, copy file writing is not performed when writing a master file, but is performed when a certain interval (e.g. the number of copy files that are not yet written, or a certain time interval) specified by user is passed. Also, in the storage system 1, the total number of copy files that are not yet written, the total volume of copy files that are not yet written, and the time elapsed since the previous copy file writing processing are held in the local memory, etc., of the processor 23 in the server 8. In the storage system 1, any of the above values or more than one of the values are specified by the administrator of the management server 5, and copy file writing starts when the above value exceeds the specified value.

When, for example, any of the total number of copy files that are not yet written, the total volume of copy files that are not yet written, and the elapsed time from the previous copy file writing processing, or more than one of them exceed the value specified by the administrator of the management server 5, the processor 23 in each server 8 specifies the copy storage RAID group 11 in which a not-yet-written copy file is to be written with reference to the file storage location management table 34, in accordance with the copy file writing processing steps RT2 illustrated in FIG. 8 by running the software 31 (SP11).

Incidentally, the processors 23 in the respective servers 8 hold anticipated available spaces written in their "ANTICIPATED AVAILABLE SPACE" columns 36D in the available copy space management table 36 when starting the copy file writing processing steps RT2 in the relevant local memory of the processor 23, or similar. Also, the processors 23 in the respective servers 8 specify the copy storage RAID group 11 whose "RAID GROUP" column in their "NODE" columns 34A in the file storage location management table 34 is where "2" is written as a copy storage RAID group 11 to which a not-yet-written copy file is to be written.

Subsequently, the processors 23 in the respective servers 8 retrieve the HDD management table 62 from the storage 9 by executing the storage management software 32, retrieve information on the HDD44 constituting the specified copy storage RAID group 11, send to the storage 9 a power-on instruction for the HDD 44 constituting the aforementioned copy storage RAID group 11 (SP12). When receiving the power-on instruction, each storage 9 activates the aforementioned HDD 44 by turning on the HDD 44 constituting the relevant copy storage RAID group 11 (see FIG. 9(2)).

When receiving from the storage 9 a report that the HDD 44 constituting the copy storage RAID group is activated, the processors 23 in the respective servers 8 then send a copy file sending instruction to the server 8 (the receiving server 8) having the master file of a copy file to be written (SP13). When receiving the copy file sending request sent from the server 8, the processor 23 in the receiving server 8 creates a copy file of the relevant master file and sends the aforementioned copy file to the server 8C (see, FIG. 9(3)). Incidentally, when receiving a master file, the processor 23 in the receiving server 8 may create copy files depending on redundancy, hold them temporarily in a predetermined HDD 44, etc., and send a relevant copy file when receiving the copy file sending request. By doing so, redundancy can be maintained before copy file writing is completed.

When receiving a copy file from the receiving server 8, the processors 23 in the respective servers 8 then send the copy file to the storage 9, and write the aforementioned copy file in a relevant volume 72 in the copy storage RAID group 11 (SP14).

The processors 23 in the respective servers 8 then write "3" in the "RAID GROUP" columns for the copy storage RAID group 11 in the archive node 7, in which a copy file is written, in the file storage location management table 34 (i.e., change "2" written in the "RAID GROUP" columns to "3") (SP15).

When all file writing and updating the file storage location management table 34 are complete, the processors 23 in the respective servers 8 recognize the anticipated available spaces held in their local memory as current available paces and write the current available spaces in the relevant "CURRENT AVAILABLE SPACE" columns 36C in the available copy space management table 36 (SP16). When receiving a power-off instruction, the respective storages 9 stop the HDD 44 by turning off the aforementioned HDD 44 constituting the relevant copy storage RAID group 11 by means of the power control unit 45 (see, FIG. 9(4)).

The processors 23 in the respective servers 8 send to the storages 9 a power-off instruction for the HDD 44 constituting the activated copy storage RAID group by executing the storage management software 32 (SP17).

When receiving from the storage 9 a report that the HDD 44 constituting the copy storage RAID group 11 is stopped, the processors 23 in the respective servers 8 terminate the copy file writing processing steps RT2 shown in FIG. 8 (SP17).

As described above, in the storage system 1, the HDD 44 constituting the copy storage RAID group is activated at a predetermined time, a copy file is written in a volume 72 in the aforementioned copy storage RAID group 11, and then the HDD 44 constituting the aforementioned copy storage RAID group 11 is stopped.

Accordingly, the HDDs 44 are divided into two groups, namely, the master storage RAID group 10 and the copy storage RAID group 11, so it is possible to effectively prevent the HDD 44 from being frequently activated and stopped, minimize the running time of the HDD 44 and effectively reduce power consumption.

Incidentally, the present embodiment has described a case where the storage system is provided with four archive nodes 7 (7A-7D), but the present invention is not limited to this case and may be utilized in a case where, for example, the storage system is provided with more than one of plural archive nodes.

Also, the present embodiment has described a case where the servers 8 (8A-8D) and the storages 9 (9A-9D) are independently provided in the archive nodes 7, but the present invention is not limited to this case, and may utilize various other configurations where, for example, the archive node is a single archive node that integrates the server 8 and the storage 9.

Furthermore, the present embodiment has described a case where the storage 9 is provided with four RAID groups 71 (consisting of the RAID groups 1-4), but the present invention is not limited to this case, and may be utilized in a case where, for example, the storage 9 is provided with more than one of plural RAID groups 71.

The present invention can be utilized in a wide variety of storage systems provided with a plurality of archive nodes.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. An information processing apparatus comprising:
   a creation unit creating a preset number of pieces of second data by duplicating first data sent from a host computer, and holding the second data in a predetermined area or sending the second data to another information processing apparatus;
   a distribution of archive nodes, each including at least one storage device;
   a first writing unit for distributing the first data to a first storage device in a first node of the archive nodes in which the first data is to be written;
   an activation unit activating power to a second storage device in a second node of the archive nodes in which the second data is to be written at a predetermined time, the second storage device being in a stopped state;
   a second writing unit for distributing the second data to the second storage device in the second node of the distribution of archive nodes activated by the activation unit by retrieving from the predetermined area or another information processing apparatus the second data that is to be written in the second storage device after the second storage device is activated by the activation unit;
   and a stop unit stopping power to the second storage device in which the second data is written by the second writing unit.

2. The information processing apparatus according to claim 1, wherein
   the creation unit specifies the second storage device whose available space is as large as the second storage device in which the second data is written; holds the second data in a predetermined area, when the specified second storage device is the second storage device in a device to which the creation unit belongs; and sends the second data to the another information processing apparatus, when the another information processing apparatus has the specified second storage device.

3. The information processing apparatus according to claim 1, wherein
   the activation unit activates power to the second storage device when the total number of pieces of the second data that is not yet written in the second storage device exceeds a value specified by an administrator.

4. The information processing apparatus according to claim 1, wherein
   the activation unit activates power to the second storage device when the total space of the second data that is not yet written in the second storage device exceeds a value specified by an administrator.

5. The information processing apparatus according to claim 1, wherein the activation unit activates power to the second storage device when a predetermined time has passed since the last time second data was written.

6. A distributive archival data writing method in an information processing apparatus, comprising:
   a first step where a creation unit creates a preset number of pieces of second data by duplicating first data sent from a host computer, and the creation unit holds the second data in a predetermined area or sends the second data to another information processing apparatus;
   a second step where a writing unit distributes the first data to a first storage device in a first node of a distribution of archive nodes in which the first data is to be written;
   a third step where an activation unit activates power to a second storage device in a second node of the archive nodes in which the second data is to be written at a predetermined time, the second storage device being in a stopped state;
   a fourth step where the writing unit distributes the second data to the second storage device in the second node of the distribution of archive nodes activated in the third step by retrieving from the predetermined area or another information processing apparatus the second data that is to be written in the second storage device after the second storage device is activated in the third step;
   and a fifth step where a stop unit stops power to the second storage device in which the second data is written in the fourth step.

7. The data writing method in an information processing apparatus according claim 6, wherein
   in the first step,
   the second storage device whose available space is large is specified as the second storage device in which the second data is written; the second data is held in a predetermined area, when the specified second storage device is the second storage device in a device to which the creation unit belongs; and the second data is sent to the another information processing apparatus, when the another information processing apparatus has the specified second storage device.

8. The data writing method in an information processing apparatus according claim 6, wherein
   in the third step,
   power to the second storage device is activated when the total number of pieces of the second data that is not yet written in the second storage device exceeds a value specified by an administrator.

9. The data writing method of an information processing apparatus according claim 6, wherein
   in the third step,
   power to the second storage device is activated when the total space of the second data that is not yet written in the second storage device exceeds a value specified by an administrator.

10. The data writing method of an information processing apparatus according claim 6, wherein
    in the third step,
    the activation unit activates power to the second storage device when a predetermined time has passed since the last time second data was written.

11. A program for an information processing apparatus, the program being embodied in a tangible computer recording medium and executing:
    a first step of creating a preset number of pieces of second data by duplicating first data sent from a host computer, and holding the second data in a predetermined area or sending the second data to another information processing apparatus;
    a second step of distributing the first data to a first storage device in a first node of a distribution of archive nodes in which the first data is to be written;
    a third step of activating power to a second storage device in a second node of the distribution of archive nodes in which the second data is to be written at a predetermined time, the second storage device being in a stopped state;

a fourth step of distributing the second data to the second storage device in the second node of the distribution of archive nodes activated in the third step by retrieving from the predetermined area or another information processing apparatus the second data that is to be written in the second storage device after activating the second storage device in the third step;

and a fifth step of stopping power to the second storage device in which the second data is written in the fourth step.

12. The program according claim 11, wherein in the first step, the second storage device whose available space is large is specified as the second storage device in which the second data is written; the second data is held in a predetermined area, when the specified second storage device is the second storage device in a device to which the creation unit belongs; and the second data is sent to the another information processing apparatus, when the another information processing apparatus has the specified second storage device.

13. The program according claim 11, wherein in the third step, power to the second storage device is activated when the total number of pieces of the second data that is not yet written in the second storage device exceeds a value specified by an administrator.

14. The program according claim 11, wherein in the third step, power to the second storage device is activated when the total space of the second data that is not yet written in the second storage device exceeds a value specified by an administrator.

15. The program according claim 11, wherein
in the third step,
the activation unit activates power to the second storage device when a predetermined time has passed since the last time second data was written.

* * * * *